United States Patent [19]

Davies

[11] Patent Number: 5,412,650

[45] Date of Patent: May 2, 1995

[54] METHOD OF, AND SYSTEM FOR, TRANSMITTING DATA OVER A COMMUNICATIONS CHANNEL

[75] Inventor: Robert J. Davies, Redhill, England

[73] Assignee: U.S. Philips Corporation, New York, N.Y.

[21] Appl. No.: 114,525

[22] Filed: Aug. 31, 1993

[30] Foreign Application Priority Data

Sep. 5, 1992 [GB] United Kingdom ............... 9218864

[51] Int. Cl.⁶ ............................. H04J 3/16; H04J 3/22
[52] U.S. Cl. ....................................... 370/82; 370/84; 370/95.3; 370/112
[58] Field of Search ........................ 370/79, 82, 83, 84, 370/85.7, 94.1, 95.1, 95.3, 99, 102, 105.1, 112, 118; 379/58, 59, 60; 455/33.1, 33.2, 49.1, 53.1, 54.1, 56.1

[56] References Cited

U.S. PATENT DOCUMENTS

| | | | |
|---|---|---|---|
| 3,982,074 | 9/1976 | Clark | 370/84 |
| 3,982,077 | 9/1976 | Clark et al. | 370/84 |
| 4,204,093 | 5/1980 | Yeh | 370/95.3 |
| 4,748,621 | 5/1988 | Ballance et al. | 370/95.3 |
| 4,860,283 | 8/1989 | Talcano et al. | 370/82 |
| 4,979,169 | 12/1990 | Almond et al. | 370/99 |
| 4,999,832 | 3/1991 | Chen et al. | 370/85.14 |
| 5,170,395 | 12/1992 | Shinmyo | 370/95.3 |

FOREIGN PATENT DOCUMENTS 0147865 7/1985 European Pat. Off. .

Primary Examiner—Alpus Hsu
Attorney, Agent, or Firm—Leroy Eason

[57] ABSTRACT

In a cordless communications system, such as DECT, data is transmitted to or from a data terminal in an assigned channel in each TDMA frame. In order to accommodate data terminals having lower data rates than the capacity of the channel, such a data terminal accumulates its data during several frames in a buffer store until the accumulated data corresponds to the channel capacity, and is then transmitted in the frame in which that occurs. In order to utilize such interruptions in transmission from a plurality of low rate data terminals, the system control terminal treats each successive sequence of a predetermined number of frames (FR0 to FR15) as a multiframe, and transmissions from low rate data terminals are assigned to multiplexed frames which minimize the number of unoccupied channels in each multiframe.

7 Claims, 6 Drawing Sheets

METHOD OF, AND SYSTEM FOR, TRANSMITTING DATA OVER A COMMUNICATIONS CHANNEL

BACKGROUND OF THE INVENTION

1. Field of the Invention

The present invention relates to a communications system, and particularly but not exclusively to channel management procedure for use when transmitting low rate data over a TDMA communications system such as a digital cordless telephone system for example DECT (Digital European Cordless Telephone). By low rate data is meant a data rate which is a binary submultiple of the data rate for one TDMA time slot.

2. Description of the Related Art

FIGS. 1 and 2 of the accompanying drawings illustrate respectively an example of a digital cordless telephone system and the channel and message structure in accordance with the DECT protocol.

The illustrated digital cordless telephone system comprises a plurality of primary or base stations PS of which four, PS1, PS2, PS3 and PS4, are shown. Each of the primary stations is connected by way of a respective wideband landline link 10, 11, 12 and 13, capable of carrying data at a rate of say 1.152 Mbits/sec. to cordless telephone system controllers 14 and 15. The system control terminals 14 and 15 are, in the illustrated embodiment, connected to the PSTN which is constituted by an ISDN (Integrated Services Digital Network) link.

The system further comprises a large plurality of secondary stations SS some of which, SS1, SS2, SS4 and SS5, are hand portable and are used for digital time division duplex speech communication only. Others, for example SS3 and SS6, are data terminals which also are capable of duplex data communication. Duplex communication between the secondary stations within an area covered by a system control terminals and/or the PSTN is by way of radio through the primary stations PS, which act as relay stations. Accordingly the primary and secondary stations each comprise a radio transmitter and receiver.

Referring to FIG. 2, the illustrated system has ten radio channels, hereinafter referred to as frequency channels C1 to C10, each capable of carrying digitised speech or data at 1.152 Mbits/sec. The adjacent frequency channel separation is 1.728 Hz. Each frequency channel is divided in the time domain into 10 ms frames. Each frame is divided into 24 time slots (or physical channels) of which the first twelve F1 to F12 are allocated for transmission in a forward direction, that is from a primary station to a secondary station, and the second twelve R1 to R12 are allocated for transmission in the reverse direction. The forward and reverse time slots are twirled, that is, the correspondingly numbered forward and reverse time slots, for example F4, R4, comprise a twin which hereinafter will be referred to as a duplex voice channel. In setting-up a call between a primary and a secondary station, a duplex voice channel is assigned to the transaction. The assignment of the duplex voice channel in any of the frequency channels C1 to C10 is by the method of dynamic channel allocation, whereby a secondary station, taking account of its radio environment, negotiates with the primary station for access to the best duplex voice channel currently available.

The general structure of a message is also shown in FIG. 2. The message structure comprises two bytes of preamble 16, two bytes of a synchronisation sequence 18, six bytes of signalling data plus 2 bytes for cyclic redundancy check (CRC) 20 and forty bytes of digitised speech or data plus a four bit CRC (repeated twice) 22. The digitisation rate and data rate is 32 kbits/sec. Both the primary and secondary stations include a buffer to compress the 32 kbits/sec. data to bursts of data at 1.152 Mbits/sec. so that it is suitable for transmission.

The basic protocol for a transmission which is to be initiated by a secondary station SS is for it to listen to all the forward physical channels in each of the frequency channels C1 to C10 and ascertain which forward physical channels are busy and idle and the relative signal quality in these forward physical channels, and from the information derived the secondary station determines what it believes is the best duplex voice channel and transmits in the reverse physical channel of that duplex voice channel to a particular primary station PS. The signalling details 20 in the message together with the details 22 in the initial transmission are decoded and passed to the system controller 14 or 15 which sets-up the fixed network connection. The primary station confirms that the particular physical channel has been assigned to the transaction.

In the forward direction, the primary stations send paging messages to the addressed secondary stations in say every sixteenth frame. Such an arrangement enables the secondary stations to "sleep" during at least the intervening fifteen frames thereby economising on power. An addressed secondary station in response to a paging request addressed to it will, unless a duplex voice channel has been assigned, transmit in the reverse time slot (or physical channel) of the best duplex voice channel. As a general rule the system protocol will give priority to speech over data.

It is not unusual for a secondary station SS3 or SS6 to generate batches of data at rates in excess of 32 kbits/sec. Also, if the system is to be able to utilise an ISDN fixed wired link, then unless buffering is used, the system must be able to supply data at a rate of 144 kbits/sec. One way of doing this is for a system control terminal to allocate additional duplex voice channels to the transaction so that data packets can be transmitted in parallel.

There is also the alternative situation of a data terminal generating data at a rate which is a binary submultiple of 32 kbits/sec, for example 16 kbits/sec, and 8 kbits/sec, 4 kbits/sec. or 2 kbits/sec, such a terminal will hereinafter be referred to as a low rate data terminal. If a physical channel in each frame is assigned to a transmission from a low rate data terminal this would be an inefficient use of the radio spectrum. It has been proposed to split a physical channel into 2 or more partial physical channels and assign each partial physical channel to a respective low rate data terminal. However in a situation of the signals from two or more low rate data terminals being multiplexed on one physical channel, and one of the data terminals completing its transaction before another low rate data terminal sharing the same physical channel, then the system control terminal either has to find another low rate data terminal having a data rate not exceeding the capacity of the released partial physical channel and multiplex that with the transaction from the subsisting low rate data terminal on that physical channel or pad the released partial physical channel with idle bits in order to maintain bit synchronisation.

SUMMARY OF THE INVENTION

It is an object of the present invention to transmit low bit rate data signals in a spectrum efficient manner.

According to a first aspect of the present invention there is provided a communications system comprising a system control terminal for controlling the operation of the system, at least one primary station coupled to the system control terminal and at least one low rate data terminal, said at least one primary station and at least one low rate data terminal having means for establishing a data link between them, said data link comprising a succession of time slots each capable of transmitting X bits/sec, characterised in that the at least one low rate data terminal generates data at N bits/sec, where N is a binary submultiple of X, and in that the at least one low rate data terminal has means for accumulating X bits of generated data and when accumulated for transmitting said accumulated data in a time slot.

According to a second aspect of the present invention there is provided a method of communicating data over a communications system comprising a system control terminal, primary station transceiving means connected to the system control terminal, at least one low rate data terminal having means for establishing a data link with the primary station, said system control terminal establishing a data link with the at least one low rate data terminal, the data link comprising a plurality of time slots, each capable of transmitting data at X bits/sec, wherein said at least one low rate data terminal generates data at N bits/sec, where N is a binary submultiple of X, and wherein said at least one data terminal accumulates X bits of generated data and transmits said accumulated data in a time slot.

The communications system may be a TDMA system comprising a succession of frames of time slots (or physical channels). In such a system the accumulated data may be transmitted in an assigned time slot in one frame of every X/N frames. By means of the present invention those physical channels which are allocated to a particular low rate data terminal are fully utilised by data from said one terminal. However, that means that the corresponding physical channels normally allocated to that terminal in successive frames will not all be used in the data transaction of that terminal, and so can be allocated to another low rate data terminal having the same or a different data rate. For convenience a plurality of successive frames, say 16 frames, may be arranged as a multiframe and the frames containing a physical channel for transmitting data generated by a low rate data terminal are distributed evenly throughout the multiframe.

However as the low rate data terminals transmit and clear down in a substantially random manner, management of the physical channels in each frame has to be done by the system controller and the results communicated to the or each data terminal concerned.

In one embodiment of the present invention the allocation of the physical channels in a multiframe is such that wherever possible a new data transaction from the highest of the low rate data terminals can be handled. Such a method of allocation of the physical channels will require some control signalling to the low rate data terminals. For convenience the system controller maintains a map of the currently occupied or empty physical channels.

The present invention further provides a system control terminal for use in a communications system in which data is transmitted over a data link comprising a frame formed by a plurality of time slots, the system control terminal comprising means for forming a multiframe consisting of a plurality of said frames, means for establishing a data link with a low rate data terminal generating data at a rate N which is a binary submultiple of the data rate of a communication channel and means for allocating a time slot in 1 of every X/N frames of the multiframe for a transmission of data accumulated by the low rate data terminal at the data rate of the communication channel.

BRIEF DESCRIPTION OF THE DRAWINGS

The present invention will now be described, by way of example, with reference to the accompanying drawings, wherein:

FIG. 8 is a block schematic diagram of a system controller.

DESCRIPTION OF PREFERRED EMBODIMENTS

Figure 2:
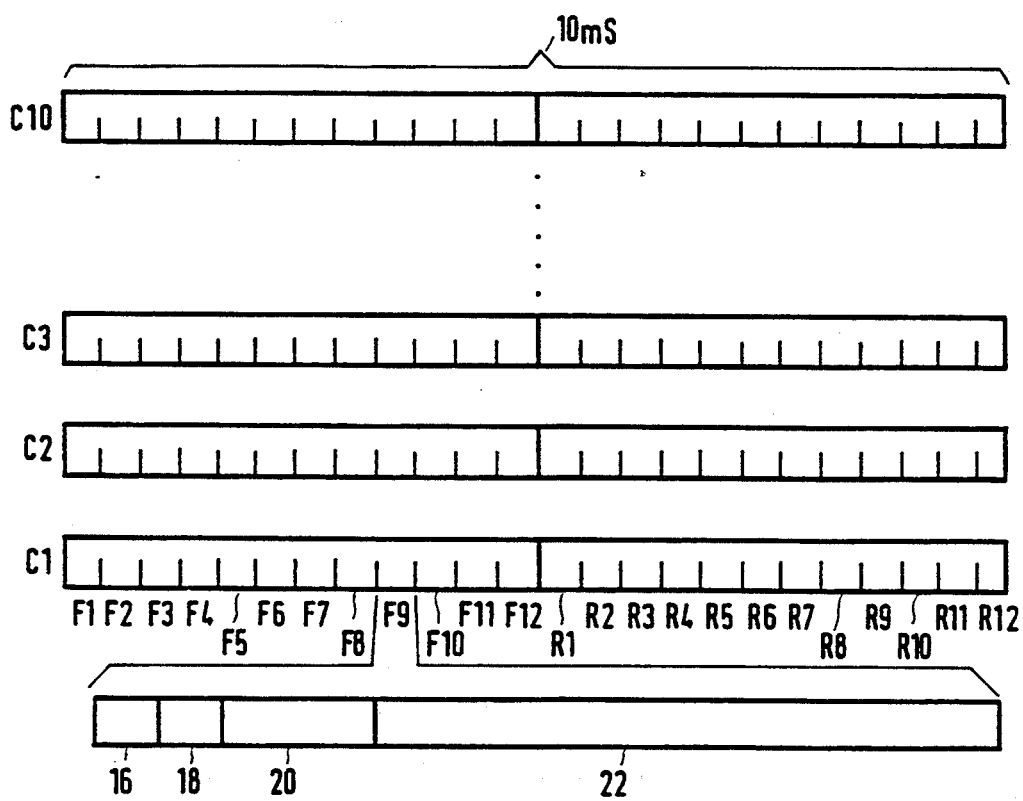
FIG. 2 is a diagram of the channel and message structure.
Figure 3:
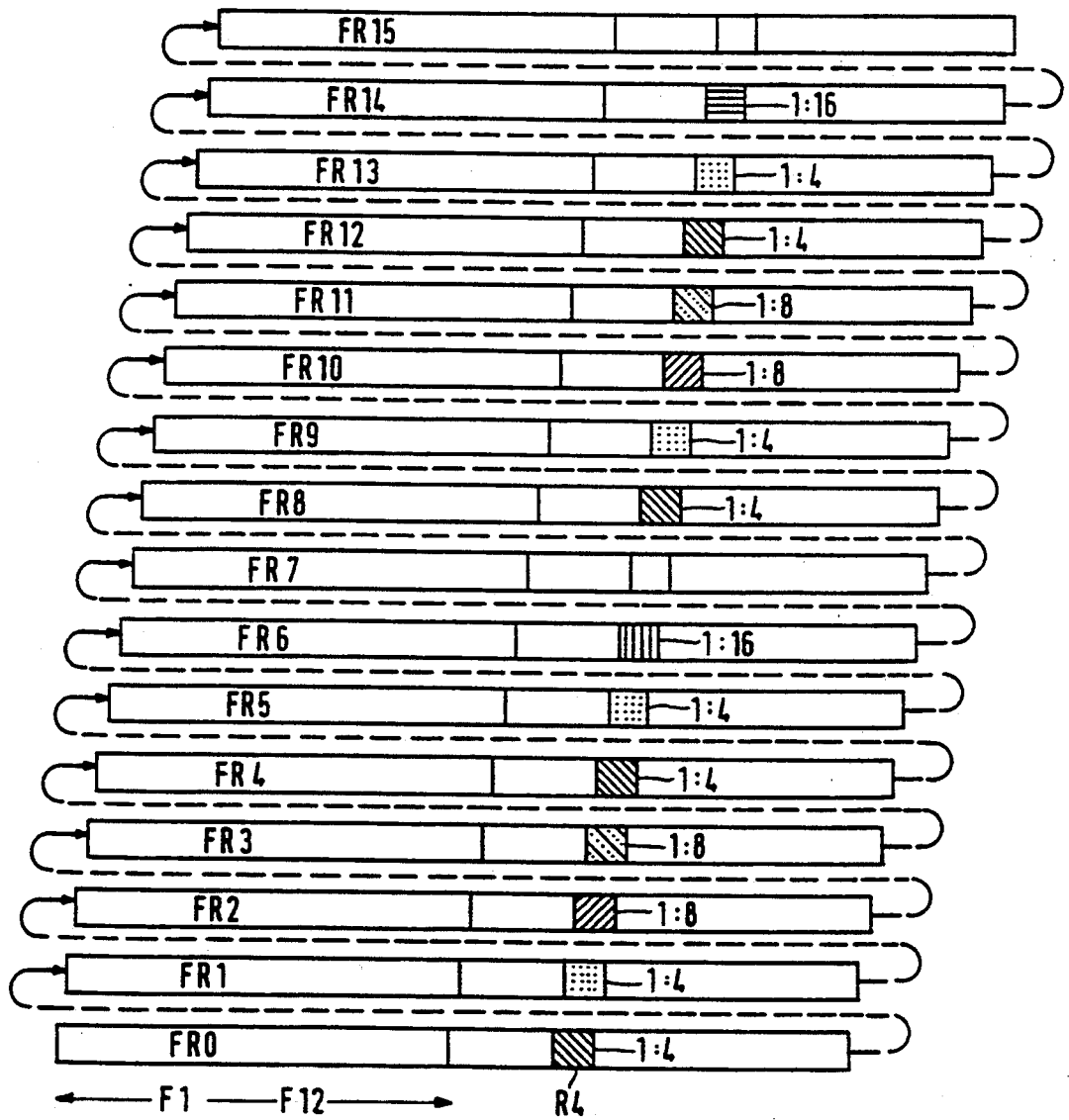
FIG. 3 is a diagram of a multiframe comprising sixteen concatenated frames FR0 to FR15.

Referring to FIG. 3, the illustrated multiframe comprises sixteen concatenated TDMA frames FR0 to FR15, each frame having the same time slot or physical channel structure as shown in FIG. 2. The system includes a plurality of low rate data terminals which amongst themselves have different data rates such as 16 kbits/sec, 8 kbits/sec, 4 kbits/sec, and 2 kbits/sec, each of which is a binary submultiple of 32 kbits/sec, the data rate of the physical channel.

In accordance with the present invention each low rate data terminal accumulates data to be transmitted until it has 32 kbits and then transmits the data at the normal data rate for that physical channel. For example, in the case of a data terminal generating data at 8 kbits/sec., it has sufficient data for transmission once in every 32/8=4 frames. When initiating a data transaction, the low rate data terminal has to obtain a duplex voice channel using the dynamic allocation method described in the preamble of this specification and transmit amongst other things its identity to the primary station, which in turn relays it to the system control terminal. The system control terminal checks the identity against the terminal identities registered with the system, and determines that it is an 8 kbits/sec. terminal and so will require one reverse physical channel in every four successive frames in order to transmit a full physical channel's worth of data. The system control terminal which has created a multiframe of 16 frames for use by low rate data terminals, maintains a list of free and occupied physical channels in a channel map store. For convenience the system control terminal has reserved one physical channel in each frame, say channel R4 in one frequency channel, for use by low rate data terminals. The system controller scans the map store to see if it is able to accept a data terminal requiring 1 physical channel in every 4 frames for its transmission. Assuming that there is no difficulty, the system control terminal informs the data terminal by way of the primary station which frames of the multiframe the data terminal can transmit in. The start of each multiframe is indicated by a flag transmitted in the first frame and the data terminal utilises its internal clock to determine the instances in which it can transmit. Because there may be several low rate data terminals involved in separate data transactions, the system control terminal has to operate a multiplex channel management procedure.

If for example the low rate data terminals have all the same data rate, then the multiplex channel management is relatively simple as indicated in the following tabular summary. The legends Two-, Four-, Eight- and Sixteen-way refer to the sequential levels of the multiplexed frames of terminals generating data at 16, 8, 4 and 2 kbits/sec, respectively.

|       | Multiplexing       |                     |                       |                          |
|-------|--------------------|---------------------|-----------------------|--------------------------|
| FRAME | 16 KB<br>Two-way   | 8 KB<br>Four-way    | 4 kb<br>Eight-way     | 2 kb<br>Sixteen-way      |
| FR 0  | Call 0             | Call 0              | Call 0                | Call 0                   |
| FR 1  | Call 1             | Call 1              | Call 1                | Call 1                   |
| FR 2  | Call 0             | Call 2              | Call 2                | Call 2                   |
| FR 3  | Call 1             | Call 3              | Call 3                | Call 3                   |
| FR 4  | Call 0             | Call 0              | Call 4                | Call 4                   |
| FR 5  | Call 1             | Call 1              | Call 5                | Call 5                   |
| FR 6  | Call 0             | Call 2              | Call 6                | Call 6                   |
| FR 7  | Call 1             | Call 3              | Call 7                | Call 7                   |
| FR 8  | Call 0             | Call 0              | Call 0                | Call 8                   |
| FR 9  | Call 1             | Call 1              | Call 1                | Call 9                   |
| FR 10 | Call 0             | Call 2              | Call 2                | Call 10                  |
| FR 11 | Call 1             | Call 3              | Call 3                | Call 11                  |
| FR 12 | Call 0             | Call 0              | Call 4                | Call 12                  |
| FR 13 | Call 1             | Call 1              | Call 5                | Call 13                  |
| FR 14 | Call 0             | Call 2              | Call 6                | Call 14                  |
| FR 15 | Call 1             | Call 3              | Call 7                | Call 15                  |
| FR 0  | Call 0             | Call 0              | Call 0                | Call 0                   |
| FR 1  | Call 1             | Call 1              | Call 1                | Call 1                   |

However such a multiplex slot management procedure is not optimum if the system includes low rate data terminals generating data at different predetermined rates and requiring different multiplex requirements. The management method shown in the table implies that each level of multiplexing used will need its own dedicated physical channel (or duplex voice channel) in successive multiframes irrespective of how empty other multiplexed physical channels may be. However a more flexible scheme is one in which callers wanting different levels of multiplexing use the same physical channel up to the full capacity of the multiframe. This is illustrated in FIG. 3 in which the reverse slot R4 is used for low rate data transmissions and the different hatchings indicate different terminals having various predetermined data rates requiring four-, eight- or sixteen-way multiplexing indicated as 1:4, 1:8 and 1:16, respectively. Thus from FIG. 3 it will be noted that respective 1:4 transmissions are being made in frames FR0, FR4, FR8, FR12 and in frames FR1, FR5, FR9, FR13, respective 1:8 transmissions are being made in frames FR2, FR10 and FR3, FR11, and respective 1:16 transmissions are being made in frames FR6 and FR14. Frames FR7 and FR15 are empty. If one or more of the transmissions cease and the relavent terminal(s) clear(s) down, then empty physical channels will occur in one or more frames which may not be distributed evenly throughout the multiframe. One effect of this uneven distribution of physical channels may be that the system controller may refuse a request on the ground that the multiplexing pattern required is not possible with the distribution of the empty physical channels held in its map store even though the number of empty physical channels is itself sufficient. However the distribution of the empty physical channels will permit the multiplexing of lower data rate transactions. In order to overcome this problem the multiplex channel management procedure includes a channel organisation algorithm which rearranges the occupied physical channels so that at any one time a request from the highest of the low rate data terminals can be accepted. For example if 4 physical channels are available but not evenly distributed, then the algorithm endeavours to rearrange them so that they are in the sequence FR0, FR4, FR8, FR12 or similar. Consequently not only can a 1:4 multiplexing request be accepted but also, as an alternative, two 1:8, four 1:16 or one 1:8 and two 1:16 requests. Frequently the rearrangement of the physical channels will involve moving subsisting 1:8 and 1:16 transactions to other frames in the multiframe and insodoing instructing the data terminals to change accordingly.

Assuming that most data terminals are fixedly sited with respect to their closest primary station, then a handover from one primary station to another is only likely to occur if the propagation path is interrupted by, for example the shifting of a large article of furniture in say an office environment. The situation will probably be different if the data terminal is portable and is transmitting whilst on the move. Handover of a subsisting data transaction is complicated by the fact that an already established multiplexing pattern has to be altered by a primary station which is already involved in several multiplexed data transactions. Accordingly any algorithm should minimise the amount of interference to those data channels already allocated to physical channels in a multiframe.

Figure 4:
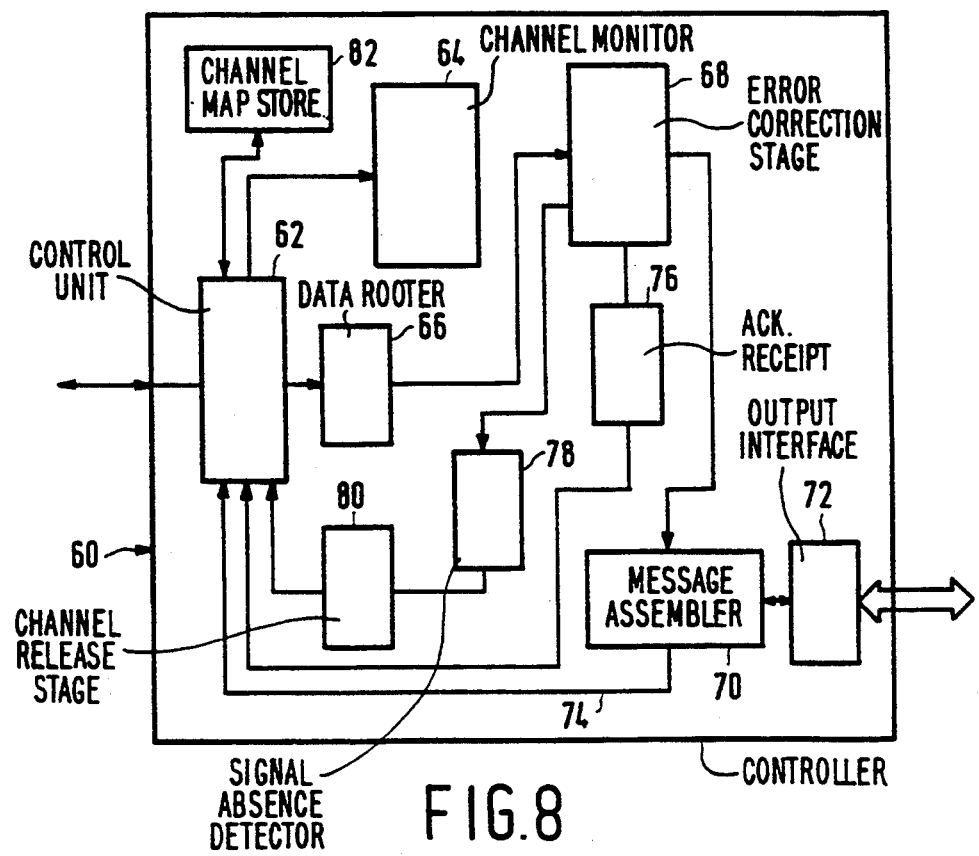
FIG. 4 is a diagram of a frame table.

Referring to FIG. 4, the illustrated frame table shows the sixteen frames R0 to F15 and the various multiplexing combinations. A 1:16 multiplexing is shown by one physical channel being required in any one of the sixteen frames. A 1:8 multiplexing requires physical channels in pairs of evenly distributed frames, namely FR0, FR8; FR4, FR12; FR2, FR10 and so on. A 1:4 multiplexing requires physical channels in groups of four evenly distributed frames such as FR0, FR8, FR4, FR12; FR2, FR10, FR6, FR14; and so on. Lastly 1:2 multiplexing requires physical channels in groups of eight evenly distributed frames, that is frames FR0, FR2, FR4, FR6, FR8, FR10, FR12, FR14, or frames FR1, FR3, FR5, FR7, FR9, FR11, FR13, FR15. By representing a multiframe as shown in FIG. 4 it is fairly easy to see what is required by a tidy-up algorithm.

At any one time, a number of multiplex calls may be in progress. There will be a number of unused frames, considered as "holes" in the table shown in FIG. 4. The tidy-up procedure must increase the size of these holes by merging smaller holes together. Two holes of size 1 can always be merged to obtain one hole of size 2. Likewise, two holes of size 2 can always be merged to a hole of size 4. However, no wrap-round of holes is permitted, and size 2 holes must be right- or left-justified in the block above. No centrally spaced (e.g. (8,4)) size 2 holes are allowed. Thus, the table in FIG. 4 allows equally spaced frames to be viewed as a contiguous block.

Data on the holes will be stored in four tables: SIZE 8, SIZE 4, SIZE 2 and SIZE 1. The procedure will have finished when no more than one entry exists in the three latter tables.

Figure 5:
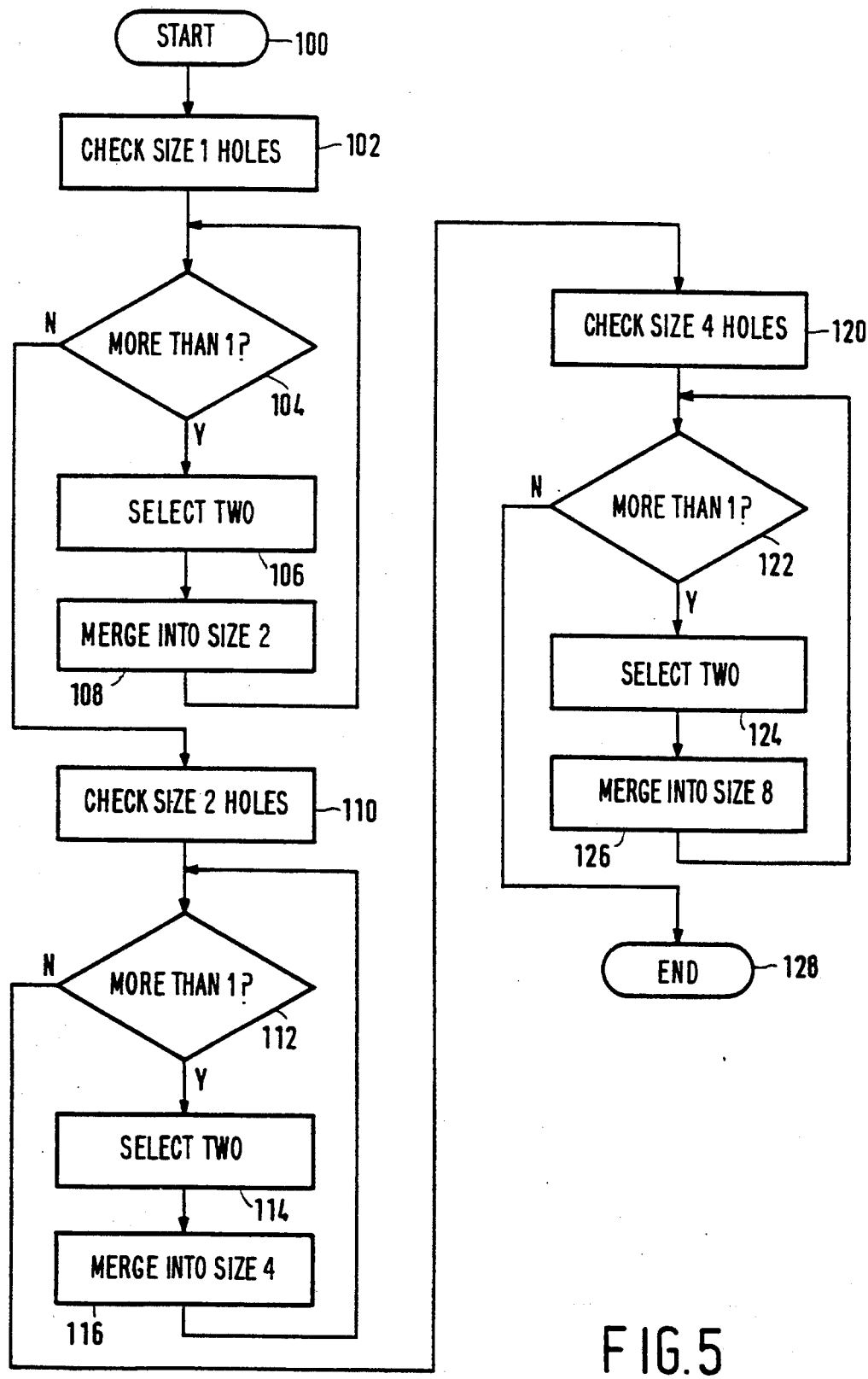
FIG. 5 is a flow chart of a tidy-up algorithm.

FIG. 5 is a flow chart of a tidy-up algorithm, that is the forming into usable groups of 2, 4 or 8 frames of empty physical channels, if necessary by reassigning operating low rate data terminals to other frames.

The flow chart begins at a start block 100. Block 102 relates to the operation of checking the size 1 hole table, that is the checking of what single frames are not allocated. Block 104 relates to checking if there is more than one size 1 hole. If the answer is Yes(Y), then two size 1 holes are selected, for example FR0 and FR8, block 106, and these two holes are merged, block 108, to form one new size 2 hole, that is FR0,FR8 which it will be noted from FIG. 4 can be used for a 1:8 transmission as well as two 1:16 transmissions. The flow chart then reverts to block 104 and if the answer is Yes(Y) the cycle of forming size 2 holes is repeated until the answer from the block 104 is No(N).

The flow chart then proceeds to block 110 where a check is made in the size 2 hole table. Block 112 relates to checking to see if there is more than one size 2 hole. If the answer is Yes(Y) then in block 114 two size 2 holes are selected, for example FR0,FR8 and FR4,FR12, and in block 116 these holes are merged to form a size 4 hole FR0, FR8, FR4 and FR12, see FIG. 4. The flow chart reverts to the block 112 and if the answer is Yes(Y) then the cycle of forming size 4 holes is repeated until the answer from the block 112 is No(N).

The flow chart then proceeds to block 120 where a check is made in the size 4 hole table, that is for groups of 4 holes which can be used for a 1:4 transmission. Block 122 relates to checking to see if there is more than one size 4 hole. If the answer is Yes(Y) then in block 124 two size 4 holes are selected, for example FR0, FR8, FR4, FR12 and FR1, FR9, FR5, FR13. In block 126 these two size 4 hole are merge to form a size 8 hole. However the merging operation may require the reassignment of four allocated frames. In the case of the example given above, the size 4 hole FR1, FR9, FR5, FR13 cannot according to FIG. 4 simply be combined with the other size 4 hole. In order to make the size 8 hole frames FR2, FR10, FR6, FR14 have to be vacated, if necessary by reassigning operating data terminals to frames FR1, FR9, FR5, FR13. Once this has been done then the vacated holes are merged with FR0, FR8, FR4, FR12 to form a size 8 hole. The flow chart then reverts to block 122. If the answer from the block 122 is No(N) the algorithm is terminated in block 128.

Figure 6:
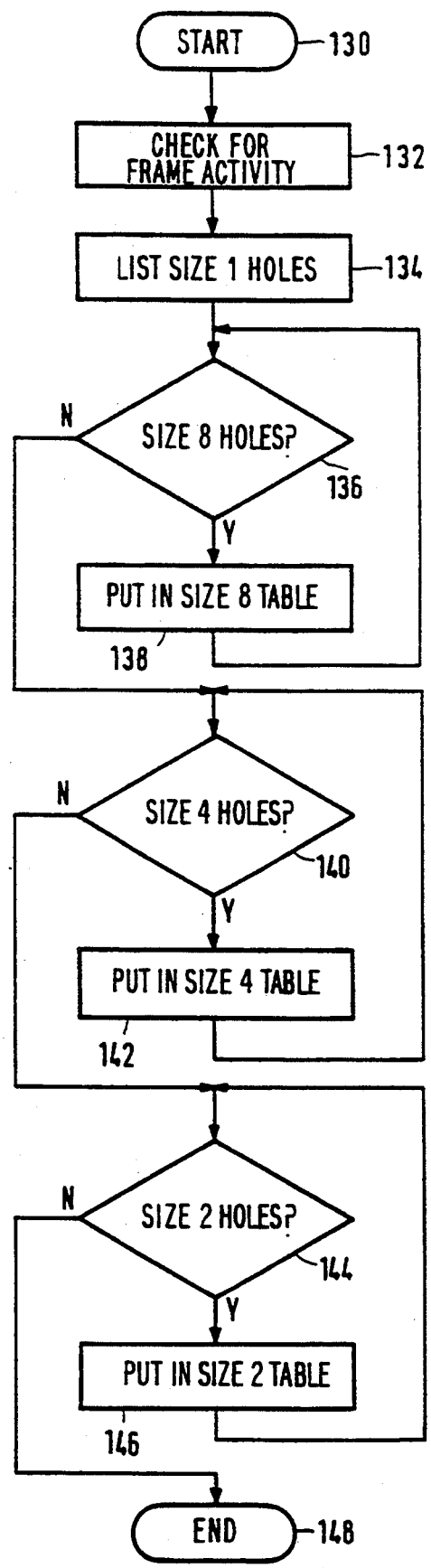
FIG. 6 is a flow chart of a find holes algorithm.

Before the tidy up procedure can be used there has to be a map of holes. Any procedure which looks for the holes will also have to classify them in order of size, making sure that a hole classified as, for example, a size 2 hole is not also represented as two size 1 holes. An algorithm for mapping the holes is shown in FIG. 6.

The flow chart begins at block 130 and the first operation, block 132, is to check each frame in the multiframe for activity. This search can be conveniently done by following the sequence shown in FIG. 4, that is FR0,FR8—FR14,FR1—FR7,FR15. The next operation is to form a list of size 1 holes, block 134.

In block 136 a check is made to see if there are any size 8 holes, that is the top or bottom row of frames in FIG. 4. If the answer is Yes(Y), then in block 138 the size 8 hole is removed from the list and added to the size 8 table. The flow chart reverts to block 136. When the answer from block 136 is No(N), the flow chart proceeds to block 140 in which a check is made to see if there are any size 4 holes, for example FR0, FR8, FR4, FR12. If the answer is Yes(Y), the size 4 hole is removed and added to the size 4 table, block 142. The flow chart reverts to the block 140. When the answer from the block 140 is No(N) the flow chart proceeds to block 144 in which a check is made to see if there are any size 2 holes. If the answer is Yes(Y), then in block 146 the size 2 hole is added to the size 2 table. The flow chart reverts to the block 144. When the answer from the block 144 is No(N), the flow chart is terminated at block 148.

In operation, when a new call is to be made, call set-up procedures will use the size 1, 2, 4 and 8 tables to find a suitable hole in which to place the call, starting with the smallest size possible and trying successively larger tables until an entry is found. The table entries must be readjusted as necessary to reflect the arrival of the new call.

Call clear-down procedures, upon completion of a call, will add the cleared frame(s) or hole to the appropriate table and call up the tidy-up procedure.

Figure 7:
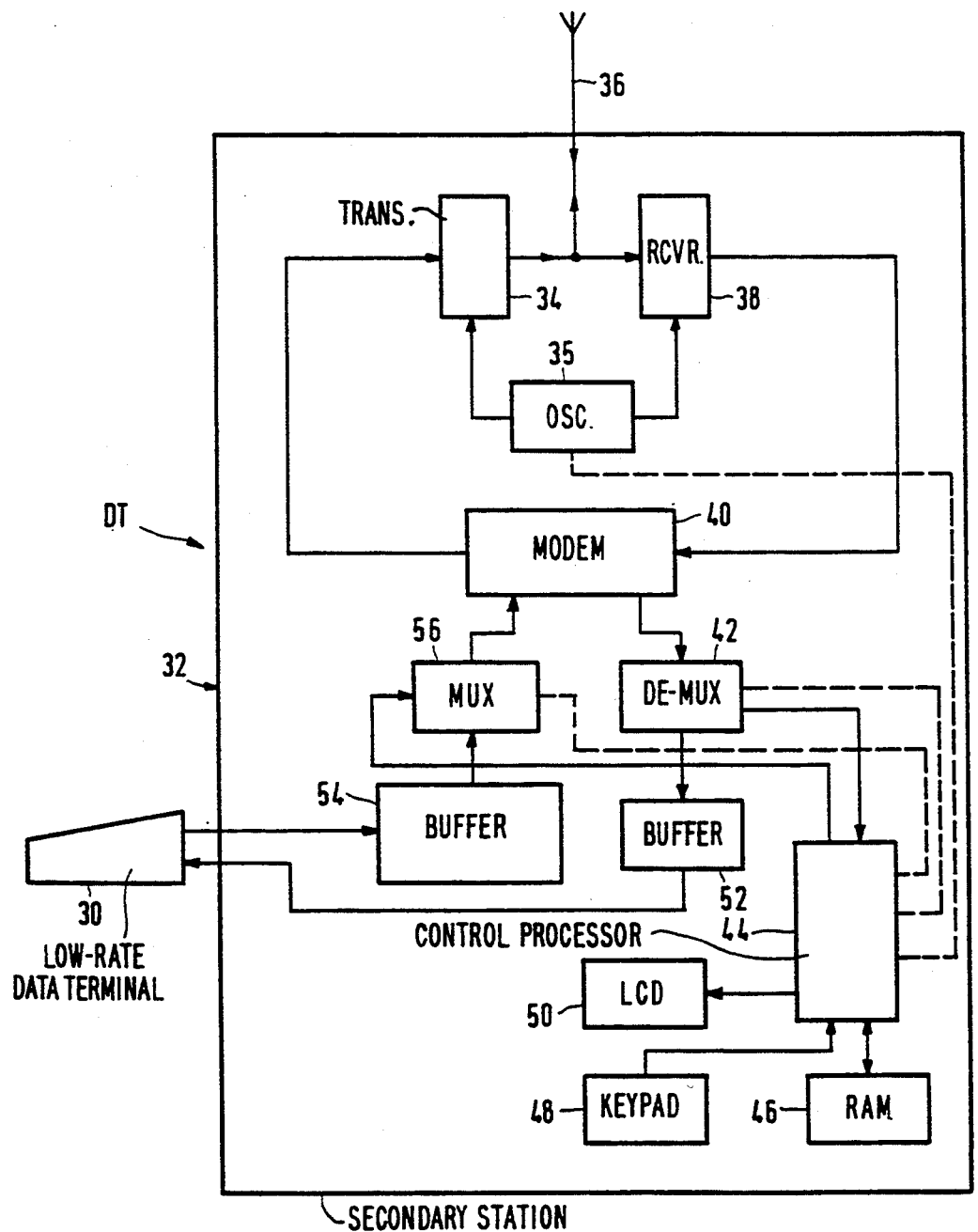
FIG. 7 is a block schematic diagram of a cordless data terminal.

FIG. 7 illustrates an embodiment of a data terminal DT. The terminal comprises a low rate data terminal 30 which is electrically connected to a cordless secondary station 32 which may be integrated into the terminal 30. The secondary station 32 comprises a transmitter 34 connected to an antenna 36 which is also connected to a receiver 38. A local oscillator 35 is connected to the transmitter 34 and receiver 38 and is controlled to select the particular frequency channel of the ten available for DECT. A MODEM 40 is connected to both the transmitter 34 and the receiver 38. An output of the MODEM 40 is connected to a de-multiplexer 42 which separates signalling data from message data. The signalling data is relayed to a control processor 44 which controls the operation of the secondary station 32. The control processor 44 is also connected to a RAM 46 which stores control data, a keypad 48 and a LCD device 50. Any message data for the data terminal is held in a buffer store 52 in readiness for transferring to the data terminal 30. Low rate data from the terminal 30 is accumulated in another buffer store 54. An output from the buffer store 54 is connected to an input of a multiplexer 56 which multiplexes signalling data from the control processor 44 with message data from the store 54. An output of the multiplexer 56 is connected to the MODEM 40.

Figure 1:
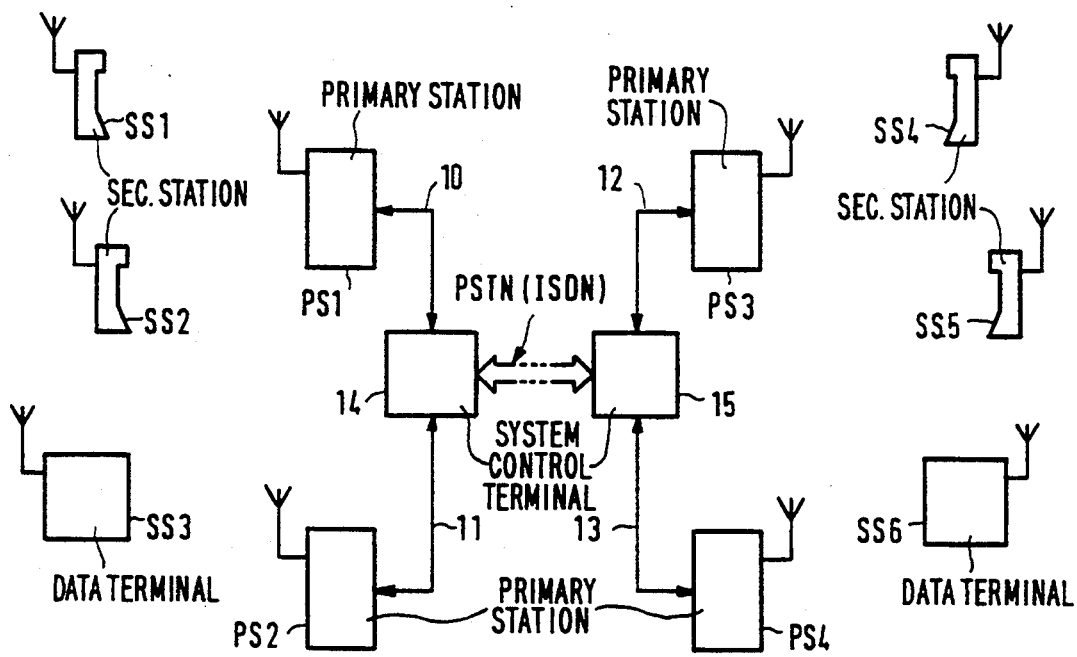
FIG. 1 is a block schematic diagram of a cordless telephone system.

FIG. 8 illustrates diagrammatically an intelligent controller 60 which can, for example be used as part of the system control terminal 14 or 15 in FIG. 1. The controller 60 comprises a control unit 62 which serves amongst other things to control the routing of data within the controller and to control the multiplex channel management operation. Means 64 are connected to the control unit 62 for monitoring the radio channels, for maintaining a record of the busy and idle duplex voice channels and for multiplexing data signals low rate data terminals on the corresponding physical channels of the frames of a multiframe. A data router 66 directs data packets to an error checking and correction stage 68. Data packets which have been deemed correct by the stage 68 are transferred to a message assembler 70 which builds up a data message using for example a packet numbering system. Messages to be forwarded are transferred to an output interface 72 which may be coupled to an ISDN link. Input message data from an external source such as the ISDN link are transferred to the message assembler 70 by the interface 72. In the assembler messages for onward transmission are reformatted and are routed to the control device 62 by means of a bus 74. The control device multiplexes the different data messages into the relevant physical channels.

Acknowledgements for the receipt of correct packets are generated in a stage 76 and relayed to the control unit 62 for onward transmission in the signalling field of the data message. If any of the data packets are found to be uncorrectable then the error correction stage 68 instructs the stage 76 to include a retransmission request in the acknowledgement which it is going to send.

The data from the error correction stage 68 is also sent to detector 78 adapted to detect an absence of signals or the presence of padding. In response to the detection of an absence of signals or padding bits in the same physical channel(s) of successive multiplexed frames, the detector 78 instructs a stage 80 to generate a physical channel release instruction which is sent to the control unit 62 which decides what should be done with the physical channel(s) to be released and issues the necessary instruction to the primary and secondary stations by way of the wideband link 10, 11 or 12, 13. A channel map store 80 is connected to the control unit 62 for storing an uptodate record of what channels are occupies or empty.

Whilst the controller 60 has been shown as comprising a plurality of circuit stages, it could be implemented using a suitably programmed microcontroller, e.g. a microcontroller from the 68000 series.

For convenience of description, the present invention has been described with reference to DECT. However, the method in accordance with the present invention may be used in other suitable systems, such as a wired LAN system.

From reading the present disclosure, other modifications will be apparent to persons skilled in the art. Such modifications may involve other features which are already known in the design, manufacture and use of digital communication systems and devices and component parts thereof, and which may be used instead of or in addition to features already described herein, without departing from the scope of the ensuing claims.

I claim:

1. A communications system comprising:
   a system control terminal for controlling the operation of the system, a primary station coupled to the system control terminal, at least a first low rate data terminal, and a data link between said first low rate data terminal and said primary station;
   said data link being a time slot channel assigned by the system control terminal in each of successive frames of a series of time division multiplexed time slot channels, each time slot channel being capable of data transmission at a predetermined binary rate of X bits/sec such that $X \geq 8$;
   characterized in that:
   said low first rate data terminal comprises means for generating data at a rate of N bits/sec, where N is a binary submultiple of X; means for accumulating X bits of the generated data during every successive number X/N of frames; and means for transmitting the accumulated data in said assigned time slot channel during each X/N th frame.

2. A communications system as claimed in claim 1, further comprising a second low rate data terminal having means for generating data at a rate of M bits/sec, where M is a binary submultiple of X different from N; means for accumulating X bits of generated data during every successive number X/M of frames; and means for transmitting the accumulated data in a time slot channel during each X/M th frame.

3. A communications system as claimed in claim 2, wherein each series of a predetermined number of successive frames constitutes a multiframe, and said system control terminal causes the transmissions from said first and second data terminals to be multiplexed in the same time slot channel but in different frames of each multiframe.

4. A communications system as claimed in claim 3, further comprising at least a third low-rate data terminal; the system control terminal being responsive to a clearing-down of transmission from a low-rate data terminal to re-allocate usage of frames in each multiframe by the remaining low-rate data terminals so as to enable cleared-down frames to be multiplexed for transmission of data by at least one of the remaining low-rate data terminals.

5. A system control terminal for use in a communications system which includes a low rate data terminal and wherein data is transmitted from said data terminal over a data link in the form of a time slot in each of successive frames of a series of time division multiplex time slots, each time slot being capable of data transmission at a predetermined binary rate of X bits/sec such that $X \geq 8$, each series of a predetermined number of frames constituting a multiframe, the low rate data terminal generating data at a rate of N bits/sec, where N is a binary submultiple of X; characterized in that said system control terminal comprises means for allocating to said data terminal a time slot in the X/N th frame of every multiframe, said allocated time slot being for transmission of data accumulated by the low rate data terminal during X/N frames of said multiframe, whereby the accumulated data is transmitted by the low rate data terminal in said allocated time slot at the time slot rate of X bits/sec.

6. A system control terminal as claimed in claim 5, wherein said communications system includes at least a second low rate data terminal, and said system control terminal further comprises means for multiplexing transmissions from at least two low rate data terminals in the same time slot during different frames of each multiframe.

7. A system control terminal as claimed in claim 6, further comprising means which, in response to a clearing down of transmission from a low rate data terminal, reallocates usage of frames in each multiframe so as to provide a distribution of allocated frames which maximizes the data transmission capacity of the system for low rate data terminals.

* * * * *